United States Patent [19]

Carobbi et al.

[11] Patent Number: 5,011,535
[45] Date of Patent: Apr. 30, 1991

[54] STABLE BORON RESINS OF HIGH SELECTIVE ABSORBENT POWER

[75] Inventors: Renato Carobbi, Pistoia; Franco Innocenti, Bagno A Ripoli, both of Italy

[73] Assignee: Inalco S.p.A., Milan, Italy

[21] Appl. No.: 527,837

[22] Filed: May 24, 1990

Related U.S. Application Data

[63] Continuation-in-part of Ser. No. 171,447, Mar. 21, 1988, Pat. No. 4,937,294.

[30] Foreign Application Priority Data

Apr. 3, 1987 [IT] Italy ............................... 19965 A/87

[51] Int. Cl.⁵ ................................................ C13J 1/06
[52] U.S. Cl. ................................. 127/46.1; 127/46.2
[58] Field of Search .......................... 127/46.1, 46.2

[56] References Cited

U.S. PATENT DOCUMENTS 3,663,659  5/1972  Kray et al. .
4,355,140 10/1982  Manziek .
4,506,036  3/1985  Filippini et al. .
4,542,161  9/1985  Filippini et al. .

FOREIGN PATENT DOCUMENTS 0085836  8/1983  European Pat. Off. .
0159521 10/1985  European Pat. Off. .

*Primary Examiner*—Bernard Lipman

[57] ABSTRACT

Stable boron resins of high selective absorbent power and their production process. Said boron resins consist of a polyacrylic matrix functionalized with quaternary ammonium groups, an epoxy group and phenylboric groups in accordance with general formula (I):

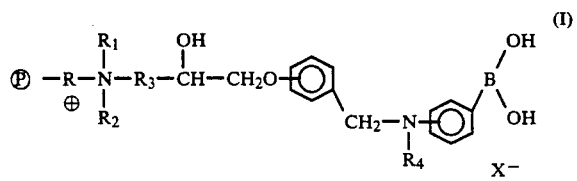

in which P, R, $R_1$, $R_2$, $R_3$, $R_4$ and $X^-$ are as defined in the text. The resins are prepared by reacting an amine resin with an epihalohydrin and condensing the reaction product with a suitable boroxin. The resins of formula (I) can be used for separating sugars, in particular for purifying lactulose. They have greater selective power than currently known boron resins.

7 Claims, No Drawings

STABLE BORON RESINS OF HIGH SELECTIVE ABSORBENT POWER

This application is a Continuation-in-Part Application of U.S. patent application Ser. No. 07/171,447, filed Mar. 21, 1988, now patented 4,937,294.

BACKGROUND OF THE INVENTION

This invention relates to new boron resins possessing very high selective absorbent power which are stable in organic solvents and in aqueous acid and alkaline solutions.

More particularly, the invention relates to boron resins consisting of an acrylic polymer matrix functionalized with quaternary ammonium groups, an epoxy group and phenylboric groups, of general formula (I):

$$\text{(P)}-R-\overset{R_1}{\underset{\underset{R_2}{|}}{\overset{|}{N}}}-R_3-\overset{OH}{\overset{|}{CH}}-CH_2O-\underset{CH_2-\underset{R_4}{\overset{|}{N}}}{\bigcirc}-\underset{OH}{\overset{OH}{\overset{|}{B}}}\quad X^- \quad (I)$$

in which
P is a polyacrylic matrix,
R is $-(CH_2)_n-$ where n lies between 0 and 5,
$R_1$ and $R_2$, which can be the same or different, are $C_1$-$C_5$ alkyl,
$R_3$ is $-(C_nH_{2n})$ where n varies from 1 to 5,
$R_4$ is H or $C_1$-$C_5$ alkyl,
$X^-$ is an anion chosen from halogens and hydroxyl;

The invention also relates to a process for producing the resins defined by general formula (I).

In European Patent 85102934.8 we have already described boron resins With a polyacrylic matrix bifunctionalized with quaternary ammonium groups and alkylphenylboric groups, which possess good chemical and mechanical stability characteristics and can be used in industrial processes, they having a marked selective absorbent action particularly in separating lactulos from its mixtures with other carbohydrates, generally lactose and galactose.

It has now been discovered that boron resins with further improved selectivity in separating sugars can be obtained by the process of the present invention, which is described in detail hereinafter.

The boron resins of the present invention are prepared from a polyacrylic resin obtained by cross-linking an acrylic ester with divinylbenzene and preferably having the following characteristics:

| Percentage of cross-linkage | 4% |
| Mean pore diameter | 1100 Å |
| Specific surface area | 10 m²/g |
| Particle size | 0.2-0.4 mm (90%) |

This resin is firstly subjected to a transamination reaction by reacting with disubstituted diamines by known methods.

Separately, a particular boroxin of the type corresponding to the indicated formula is obtained by reacting an aminophenylboroxin of formula

[structure: phenyl ring with $-NH_2$ and $B(OH)_2$]

with hydroxybenzaldehyde, to produce an intermediate of formula (II)

[structure of formula (II): phenyl-CH=N-phenyl with OH and $B(OH)_2$ substituents] (II)

To produce the boron resin, either:
(1) the transaminated polyacrylic resin is firstly reacted with an epihalohydrin:

$$\text{(P)}-R-\overset{R_1}{\underset{\underset{R_2}{|}}{\overset{|}{N}}}- \;+\; Hal-CH_2-\overset{O}{\overset{\triangle}{CH-CH_2}}$$

and the product of this reaction reacted with the boroxin (II):

$$\text{(P)}-R-\overset{R_1}{\underset{\underset{R_2}{|}}{\overset{|}{\overset{\oplus}{N}}}}-CH_2-\overset{O}{\overset{\triangle}{CH-CH_2}} \;+\; Hal^-$$

[structure: phenyl with $B(OH)_2$, N=CH, phenyl-OH]

to give $$\text{(P)}-R-\overset{R_1}{\underset{\underset{R_2}{|}}{\overset{|}{\overset{\oplus}{N}}}}-CH_2-\overset{OH}{\overset{|}{CH}}-CH_2O-\bigcirc-CH=N-\bigcirc-B(OH)_2 \quad Hal^-$$

and then $$\text{(P)}-R-\overset{R_1}{\underset{\underset{R_2}{|}}{\overset{|}{\overset{\oplus}{N}}}}-CH_2-\overset{OH}{\overset{|}{CH}}-CH_2O-\bigcirc-CH_2-NH-\bigcirc-B(OH)_2 \quad Hal^-$$

or:
(2) the boroxin (II) is firstly reacted with the epihalohydrin and the product of this reaction reacted with the transaminated polyacrylic resin, the product of this latter reaction then being reduced by NaBH₄ in methanol, to obtain a product of formula (I):

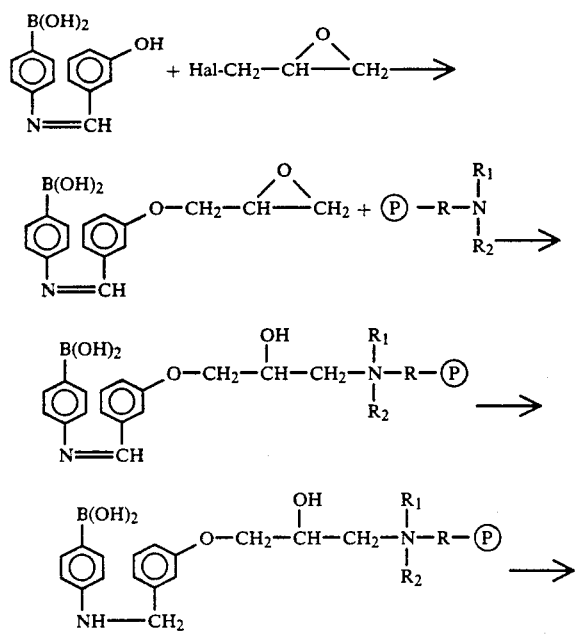

The preferred conditions for implementing the individual steps of the process in the form of the two alternatives described schematically heretofore are as follows:

(a) Transamination of the polyacrylic matrix: this is conducted by known methods U.S. Pat. No. 4,506,036, reacting the polyacrylic matrix with a disubstituted diamine.

(b) Preparation of the boroxin of formula (II): a substituted benzeneboronic acid such as an aminobenzeneboronic or oxybenzeneboronic acid is mixed with p-oxybenzaldehyde in an alcoholic solvent, and left at ambient temperature for 15-24 hours. The crude product can be used for the subsequent reactions after filtration.

(c) Reaction of the transaminated polyacrylic resin with an epihalohydrin: the aminated acrylic resin is pretreated by a process comprising regeneration in Cl form by reaction with a dilute NaCl and HCl solution at about ambient temperature, washing with demineralized water until neutral, regeneration in OH form by treatment in aqueous ammonia at around ambient temperature, washing with demineralized water until neutral, washing with acetone and drying under vacuum.

At this point the resin is placed in a polar aprotic solvent such as dioxane, and heated under reflux with epichlorohydrin dissolved in the same solvent, triggering the reaction with potassium iodide and heating under reflux between 40 and 100 C for 15-25 hours. After filtration and repeated washes with the same solvent, the crude product is ready for the subsequent reactions.

(d) Reaction of the product obtained in (c) with the boroxin of formula (II) followed by reduction: this process is conducted by suspending the product obtained in (c) in a polar aprotic solvent such as dioxane, then adding the product obtained in (b). The suspension is kept at ambient temperature for 15-30 hours under agitation. It is filtered and the product taken up in alcohol. The suspension is treated with NaBH₄ for 8-12 hours at a temperature of about 10-20 C.

After filtration, the resin is washed repeatedly by kneading with ethanol and with a mixture of ethanol and dilute hydrochloric acid, and finally with dilute hydrochloric acid alone.

(e) Reaction of the boroxin of formula (II) with the epihalohydrin: the crude product obtained in (b) is dissolved in the epihalohydrin and the mixture heated at 30-50 C for 15-24 hours. The excess epihalohydrin is then distilled off at reduced pressure at a temperature not exceeding 50 C.

The residue is taken up in alcohol and left under agitation under cold conditions for some hours.

The mixture is filtered under reduced pressure to recover the required product.

(f) Reaction of the product obtained in (e) with the aminated acrylic resin followed by reduction: the aminated acrylic resin, pretreated as described in (c) above, is placed in a solvent of the type used in (d), such as dioxane, a product such as that obtained in (e) is added, the reaction triggered with potassium iodide and the mixture heated under reflux at a temperature of between 40 and 80 C for 15-25 hours.

It is then filtered through a Buchner funnel and the residue obtained is taken up in alcohol. It is then reduced with NaBH₄ and purification as indicated for the step described in (d) above.

Some practical embodiments of the processes and resin of the present invention are given hereinafter in order to make the processes and resin more easily reproducible.

EXAMPLE 1

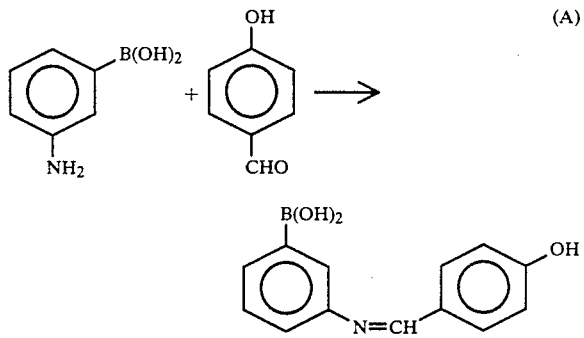

25 g of m-aminobenzeneboronic acid are dissolved in 200 ml of ethanol. 32 g of p-oxybenzaldehyde dissolved in 150 ml of the same solvent are then added.

The mixture is left to stand at ambient temperature for 18 hours.

On termination, the product obtained (40 g) is filtered off. The product is used crude in the subsequent reactions.

EXAMPLE 2

(a) Preparation of the epoxy resin from the aminated acrylic resin 45 g of acrylo-amine resin obtained by known methods are subjected to the following sequence of operations:

the resin is regenerated in Cl form by treatment with 130 ml of an NaCl solution of 100 g/l concentration at a temperature of 20 C for 60 minutes; the regeneration is completed by treatment with 150 ml of a 10% HCl solution at a temperature of 20 C for 40 minutes;

the resin is washed with demineralized water until neutral;

the resin is regenerated in OH form by treatment with 200 ml of an NH3 solution of 40 g/l concentration at a temperature of 20 C for a time of 90 minutes;

the resin is washed with demineralized water until neutral;

it is washed with acetone and dried by heating under vacuum to 55 C for 8 hours;

200 ml of dioxane are added to the resin and the resin left in dioxane at ambient temperature for 24 hours.

40 g of the resin treated in this manner, corresponding to 160 ml, are fed into a glass flask fitted with a reflux condenser, a CaCl2 tube, thermometer and mechanical agitator.

20 g of epichlorohydrin dissolved in 500 ml of dioxane and 20 g of KI are then added. The mixture is suitably agitated and kept at 50 C for 24 hours.

On termination of the reaction, the mixture is filtered through a Buchner funnel and washed by washing three times with 500 ml of dioxane followed by filtration in succession.

The product is used crude for the next reaction.

(b) Resin condensation and reduction

The crude epoxy resin from the previous reaction is taken up in 1000 ml of dioxane. 65 g of the product obtained in Example 1 are then added.

The suspension is kept at ambient temperature for 24 hours under agitation. On termination of the reaction the mixture is filtered through a Buchner funnel and the resin obtained is taken up in 1000 ml of ethanol.

The suspension is placed in a flask fitted with an agitator and 8 g of NaBH4 are added, the mixture then being kept under agitation at 10-15 C for 8 hours.

On termination of the reaction the mixture is filtered through a Buchner funnel and then washed by three successive washing and filtration operations, namely a first washing in 250 ml of ethanol, a second washing in 250 ml of an ethanol/0.5N HCl mixture in a 2/1 volume ratio, and finally a third washing in 300 ml of 0.2N HCl.

31 g of resin were obtained and have the following characteristics:

| | |
|---|---|
| degree of functionalization | 3.5 meq of B per gram of dry resin |
| percentage of cross-linkage | 4% |
| pore diameter | 1000 |
| specific surface area | 19 m²/g |
| apparent density | 0.8 g/ml |
| real density | 1.45 g/ml |
| particle size | 0.2–0.4 mm (75%) |

EXAMPLE 3

(a) Reaction of the aminated resin obtained in Example 1 with epichlorohydrin 40 g of crude product obtained in Example 1 are dissolved in 200 ml of epichlorohydrin.

The mixture is heated to 35°–40° C. for 18 hours.

On termination, the excess solvent is distilled off under vacuum While maintaining the temperature less than 45° C.

The residue is taken up in 150 ml of methanol and kept under agitation under cold conditions for 2 hours.

It is filtered under vacuum to obtain 35 g of the required product.

The product is crystallized from methylene chloride.

(b) Reaction of the product obtained in (a) with the amine resin

The acrylo-amine resin is suitably pretreated as described in the aforesaid Example 2.

20 g of the resin pretreated in this manner, corresponding to 80 ml, are placed in a glass flask fitted with a reflux condenser, a Cacl2 tube, thermometer and mechanical agitator. 600 ml of dioxane, 42 g of the product obtained under point (b) and 10 g of KI are then added. The mixture is agitated, heated to 50° C. and kept under these conditions for 24 hours.

On termination of the reaction, the mixture is filtered through a Buchner funnel and the residue obtained is taken up in 500 ml of ethanol.

The suspension is placed in a flask fitted with an agitator and 4 g of NaBH4 are added, the mixture then being kept under agitation at 10-15 C for 8 hours.

On termination of the reaction the mixture is filtered through a Buchner funnel and then washed by three successive washing and filtering operations, namely a first washing in 250 ml of ethanol, a second washing in 250 of an ethanol/0.5N HCl mixture in a 2/1 volume ratio, and finally a third washing in 300 ml of 0.2N HCl.

31 g of resin were obtained having the same characteristics as the resin obtained in Example 2.

EXAMPLE 4

A boron resin of the characteristics of example 2b is rehydrated in deionized water for 8 hours.

100 cc of this resin are placed in a 26 mm diameter column and fed for 60 minutes with 50 cc of a lactulose syrup solution (lactulose 50% by weight, lactose 4% by weight, galactose 4.5% by weight, other sugars 7% by weight) diluted 1 to 2 with deionized water and alkalinized to give a final solution of pH 8. By elution with a mobile phase of the same pH, 190 cc of a solution are obtained containing 26 g of unretained sugars, comprising:

| | |
|---|---|
| lactulose | 21 g |
| lactose | 2.4 g |
| galactose | 2.6 g |

The column is then eluted with a 1N HCl solution to obtain cc of a lactose-free solution containing:

| | |
|---|---|
| lactulose | 11 g |
| galactose | 0.2 g |

Due to their high selective absorbent power, the boron resins of the present invention are particularly suitable for separating carbohydrate mixtures, particularly for purifying lactulose containing solutions.

It is therefore another object of the present invention to provide a method for purifying an aqueous lactulose syrup containing other carbohydrates, which comprises the steps of:

(a) activating a boron resin of general formula (I)

(I)

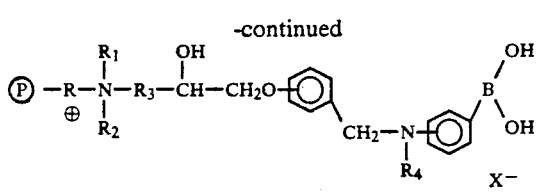

in which:
P is a polyacrylic matrix,
R is —(CH$_2$)$_n$— where n lies between 0 and 5,
R$_1$ and R$_2$, which can be the same or different, are C$_1$-C$_5$ alkyl,
R$_3$ is —(C$_n$H$_{2n}$) where n varies from 1 to 5,
R$_4$ is H or C$_1$-C$_5$ alkyl,
X is an anion chosen from halogens and hydroxyl, by salifying the resin with HCl 1N, then by treating with deionized water up to a pH value of the eluate higher than 5, then with NaOH 0.2N and finally with deionized water up to a pH value of the eluate lower than 9;

(b) contacting an aqueous lactulose syrup containing from 15% to 30% by wt. of lactulose and from 5% to 30% by wt. of other carbohydrates with said activated boron resin;

(c) eluting the carbohydrates absorbed on the boron resin with water and then with HCl from 0.5N to 1N, separately collecting the eluates.

In the preferred embodiments of the invention, the boron resin is loaded in a column, activated as described above and then the impure lactulose solution is percolated through. The rate of percolation is controlled between 0.5 and 3 volumes of syrup/volume of resin per hour. The temperature of the percolation is not a critical factor and can be comprised between 10 and 60 C without any significant effect on the absorption capacity of the resin.

The lactulose is strongly and preferably absorbed by the boron resins of the invention in an amount of from 50 to 150 g/lt of resin, independently from the presence of other carbohydrates in the impure solution.

It is thus possible to separate the other carbohydrates from lactulose by eluting the column with 3 to 4 volumes of water per resin volume, so obtaining a solution containing the larger amount of the impurities contained in the original impure syrup.

The resin is then eluted with from 1.3 to 2.5 volumes of an aqueous solution of 0.5 to 1N HCl per volume of resin by recovering a solution of lactulose with a very low content of other carbohydrates.

In the preferred embodiments of the invention, the solution of lactulose recovered by means of the HCl treatment are divided in two fractions: the first one up to a pH value of the eluate higher or equal to 3 and the second one with a pH value of the eluate lower than 3. The second fraction of the eluate contains lactulose without any trace of tagatose, lactose and galactose, which are the most common impurities of the commercial syrups of lactulose.

EXAMPLES 5-8

100 ml of a boron resin of the characteristics of example 2b are placed in a 26 mm diameter column, salified with HCl 1N, washed with deionized water up to a pH value of the eluate equal to 5, treated with 1,000 ml of 0.2N NaOH and then washed again with water up to a pH value of the eluate equal to 9. The column is fed for 60 minutes with 50 ml of a lactulose syrup solution containing 15 g of lactulose, 1.5 g of galactose and 1.3 g of lactose. The column is eluted with 170 ml of deionized water and the eluate collected (eluate A), then with 85 ml of 1N HCl up to a pH value of the effluent from the column equal to 3 and the eluate collected (eluate B) and finally with 65 ml of 1N N HCl and the eluate (having a pH lower than 3) is collected (eluate C).

The same procedure as above was repeated by changing the concentrations and the type of carbohydrates different from lactulose.

The characteristics of starting products and of the obtained eluates are reported in the following Table.

TABLE

| Ex N. | Product | lactulose (g) | galactose (g) | tagatose (g) | lactose (g) | others (g) |
|---|---|---|---|---|---|---|
| 5 | Crude syrup | 15 | 1.5 | — | 1.3 | — |
|   | eluate A | 5.3 | 1.2 | — | 1.3 | — |
|   | eluate B | 3.5 | 0.1 | — | — | — |
|   | eluate C | 6.0 | — | — | — | — |
| 6 | Crude syrup | 15 | 1.5 | 0.6 | 1.3 | — |
|   | eluate A | 5.2 | 1.2 | 0.5 | 1.2 | — |
|   | eluate B | 3.6 | 0.2 | 0.1 | — | — |
|   | eluate C | 6.1 | — | — | — | — |
| 7 | Crude syrup | 15 | 1.5 | 0.5 | 1.3 | 0.3 |
|   | eluate A | 5.3 | 1.1 | 0.3 | 1.2 | 0.3 |
|   | eluate B | 3.6 | 0.2 | 0.2 | — | — |
|   | eluate C | 6.0 | — | — | — | — |
| 8 | Crude syrup | 15 | 1.5 | 0.5 | 1.3 | 1.8 |
|   | eluate A | 5.3 | 1.0 | 0.1 | 1.3 | 0.2 |
|   | eluate B | 4.4 | 0.4 | 0.4 | — | — |
|   | eluate C | 5.3 | — | — | — | 1.4 |

What is claimed is:

1. A method for purifying an aqueous lactulose syrup containing other carbohydrates, said method comprising the steps of:

(a) activating a boron resin of general formula (I)

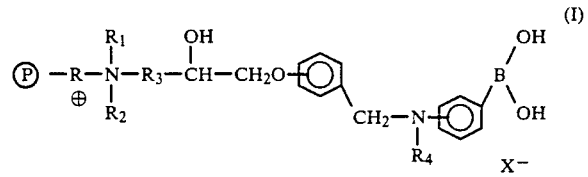

in which:
P is a polyacrylic matrix,
R is —(CH$_2$)$_n$— where n lies between 0 and 5,
R$_1$ and R$_2$, which can be the same or different, are C$_1$-C$_5$ alkyl,
R$_3$ is —(C$_n$H$_{2n}$) where n varies from 1 to 5,
R$_4$ is H or C$_1$-C$_5$ alkyl,
X$^-$ is an anion chosen from halogens and hydroxyl; by salifying the resin with HCl 1N, then by treating with deionized water up to a pH value of the eluate higher than 5, then with NaOH 0.2N and finally with deionized water up to a pH value of the eluate lower than 9;

(b) contacting an aqueous lactulose syrup containing from 15% to 30% by wt. of lactulose and from 5% to 30% by wt. of other carbohydrates with said activated boron resin; and (c) eluting the carbohydrates absorbed on the boron resin with water and then with HCl from 0.5N to 1N, separately collecting the eluates.

2. The method of claim 1, wherein said aqueous lactulose syrup is percolated through the said boron resin at a rate of from 0.5 to 3 volumes of syrup/volume of resin per hour.

3. The method of claim 1, wherein the carbohydrates absorbed on the boron resin are eluted with from 3 to 4 volumes of water per resin volume to obtain an aqueous solution of lactulose strongly enriched in other carbohydrates.

4. The method of claim 1, wherein the carbohydrates absorbed on the boron resin are eluted with from 1.3 to 2.5 volumes of an aqueous solution of 0.5 to 1N HCl per volume of resin by recovering a solution of lactulose with a very low content of other carbohydrates.

5. The method of claim 1, wherein the carbohydrates absorbed on the boron resin are eluted with an aqueous solution of 0.5 to 1N HCl by collecting a first eluate having a pH value higher or equal to 3 and then a second eluate having a pH value lower than 3, this second eluate consisting of a solution of lactulose free from galactose, lactose and tagatose.

6. A method of separating carbohydrate mixtures comprising the steps of:
  contacting a mixture of carbohydrates with a boron resin of general formula (I)

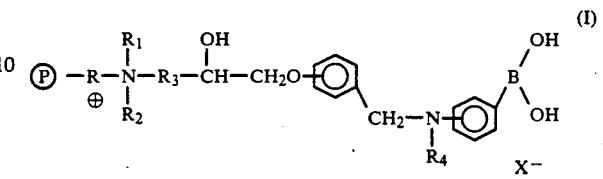

and eluting the carbohydrate/resin system with acid to separate certain carbohydrates from others.

7. The method of claim 6, wherein the carbohydrate mixture comprises a lactulose solution comprising lactulose, lactose, galactose, other sugars and water, and after eluting with acid the lactose is removed from the lactulose solution.

* * * * *